United States Patent [19]

Bois et al.

[11] Patent Number: 5,996,477
[45] Date of Patent: Dec. 7, 1999

[54] ELECTRICAL COOKING APPARATUS WITH A VAPOUR CONDENSATION DEVICE

[75] Inventors: Bernard Marcel Bois, Caen; Guy Collas, Ifs, both of France

[73] Assignee: Moulinex S.A., Paris, France

[21] Appl. No.: 09/101,670

[22] PCT Filed: Jan. 13, 1997

[86] PCT No.: PCT/FR97/00054

§ 371 Date: Nov. 5, 1998

§ 102(e) Date: Nov. 5, 1998

[87] PCT Pub. No.: WO97/25910

PCT Pub. Date: Jul. 24, 1997

[30] Foreign Application Priority Data

Jan. 15, 1996 [FR] France .................................. 96 00381

[51] Int. Cl.[6] .................................................. A47J 37/12
[52] U.S. Cl. .................... 99/403; 99/330; 126/299 D; 126/391
[58] Field of Search .............................. 99/330, 403–418; 126/391, 299 D, 299 E; 55/288, DIG. 36; 210/167, DIG. 8, 184, 187, 471

[56] References Cited

U.S. PATENT DOCUMENTS

| | | | |
|---|---|---|---|
| 3,801,331 | 4/1974 | Sano et al. | 99/403 |
| 5,029,519 | 7/1991 | Boyen | 99/341 |
| 5,400,700 | 3/1995 | Bois | 99/403 |
| 5,584,234 | 12/1996 | Baillieul et al. | 99/403 |

FOREIGN PATENT DOCUMENTS

| | | |
|---|---|---|
| WO 93/10698 | 6/1993 | European Pat. Off. . |
| WO 94/23626 | 10/1994 | European Pat. Off. . |
| 2180637 | 11/1973 | France . |
| 2303448 | 10/1976 | France . |
| 24 51 130 | 4/1976 | Germany . |
| 2 266 654 | 11/1993 | United Kingdom . |

*Primary Examiner*—Timothy Simone
*Attorney, Agent, or Firm*—Young & Thompson

[57] ABSTRACT

An electrical cooking apparatus comprises an open housing (3), a cover (12) closing the housing during the cooking phase, and a base (10). A cooking vat (5) is disposed in the housing (3) above the base (10) and is heated by an electric heater. A device (15) for condensing the cooking vapors communicates with the vat (5) through a conduit (18) permitting the flow of cooking vapors. The condensation device (15) is retractably mounted in the base (10) of the housing (3) and is horizontally slidably mounted in slideways (61) disposed in a recess (22) provided in the base (10) of the housing. This recess (22) opens in the front face (25) of the base (10) of the housing. The condensation device (15) is thus removable from the base.

11 Claims, 2 Drawing Sheets

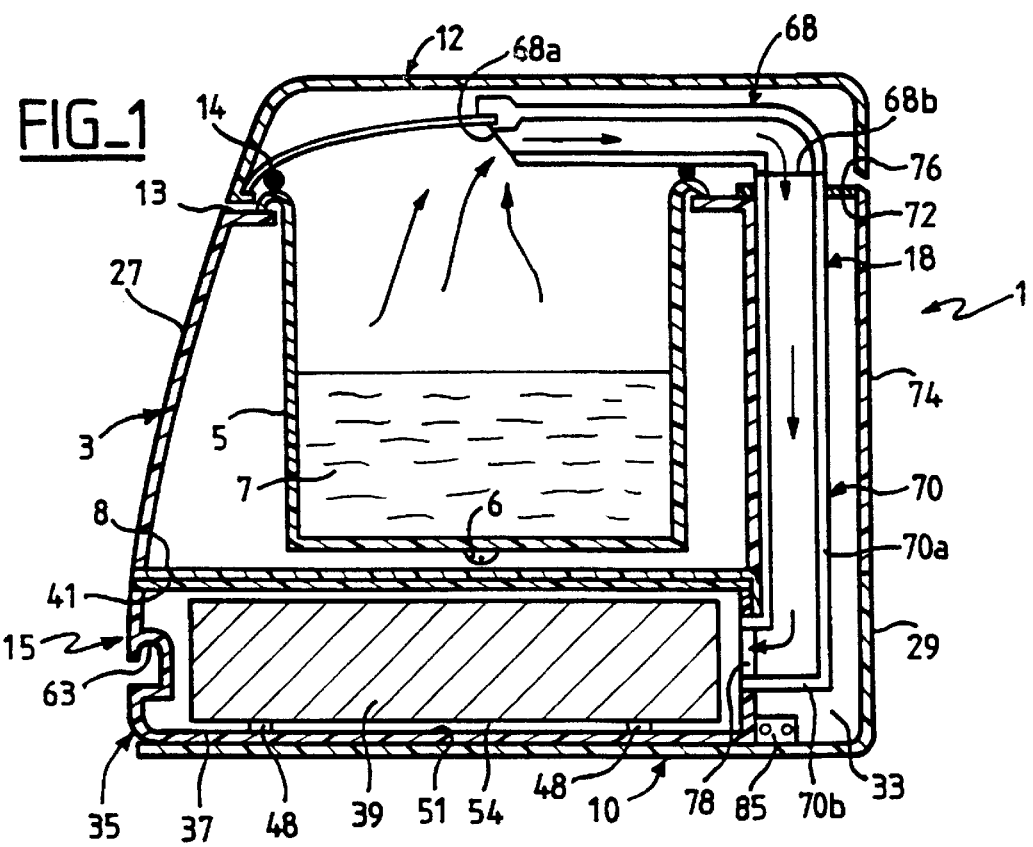
FIG_1
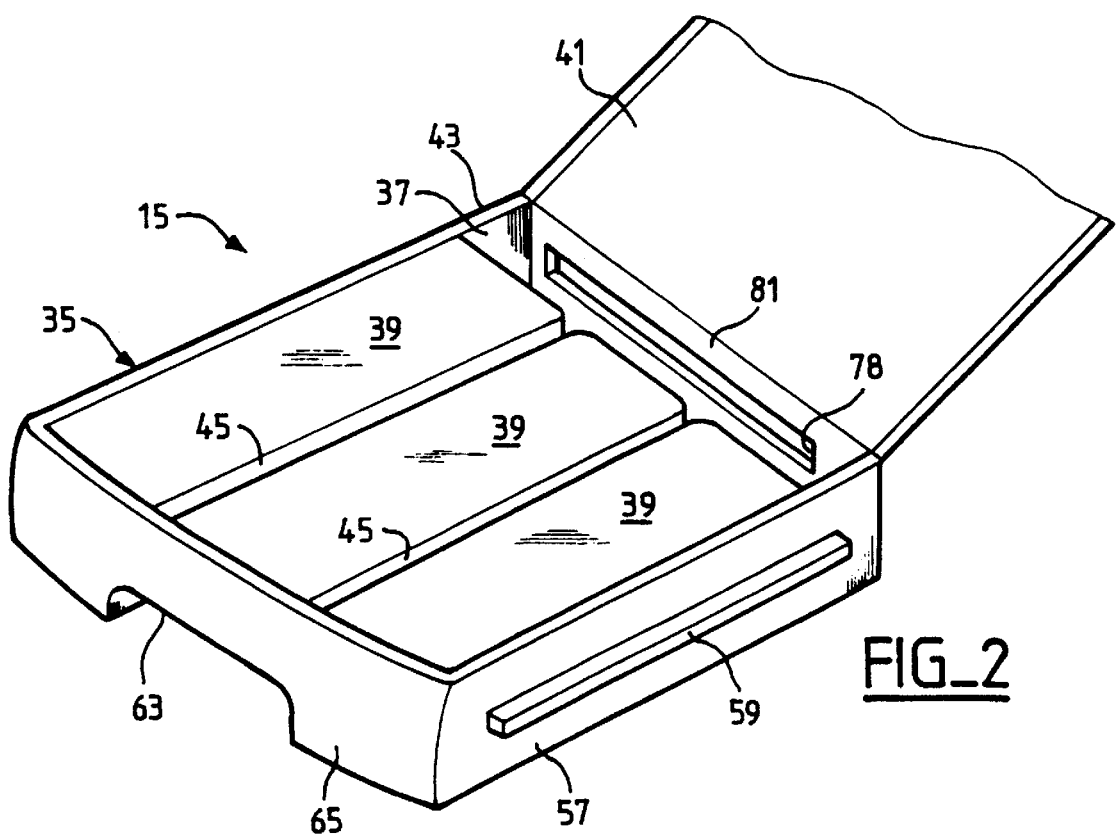
FIG_2

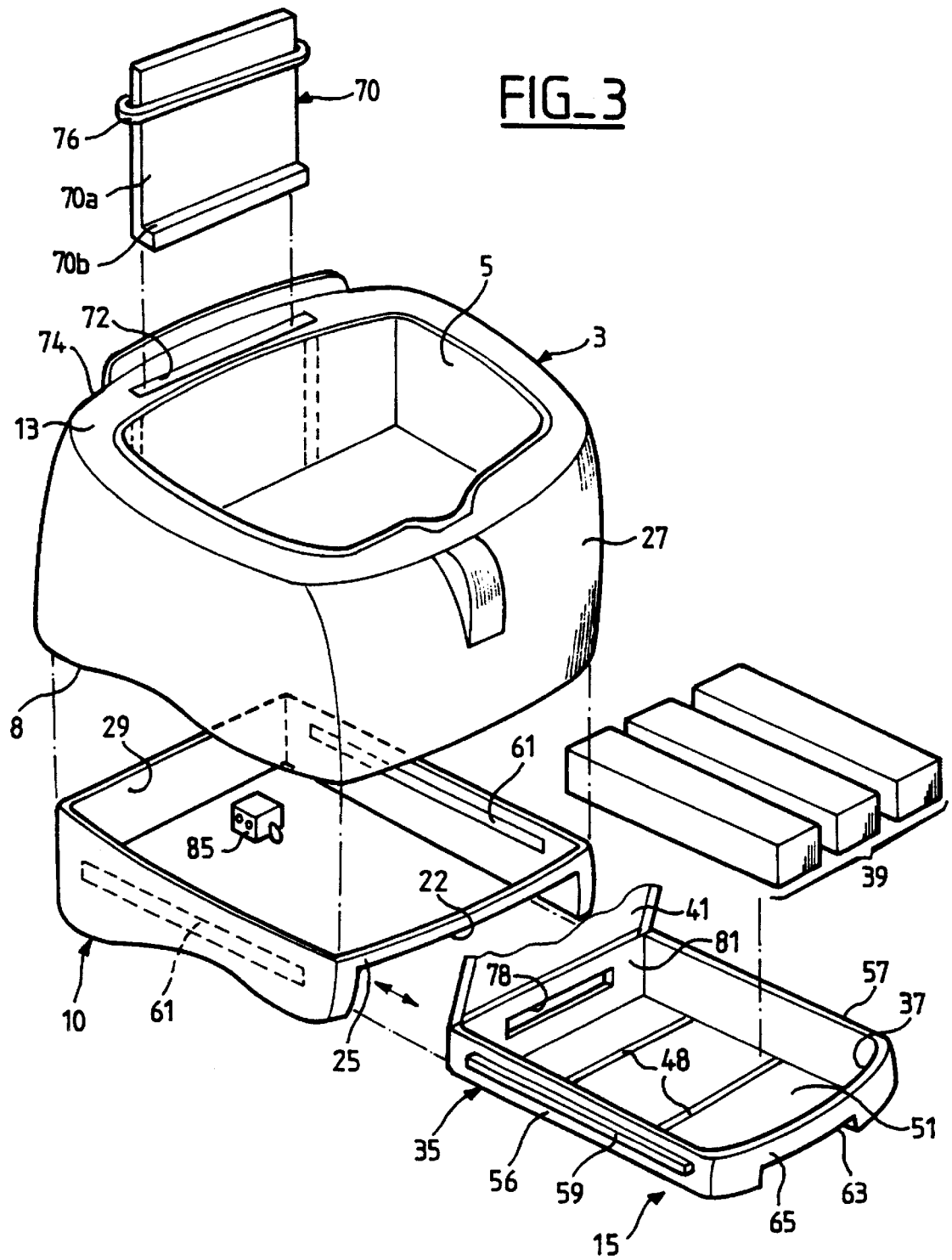

5,996,477

ELECTRICAL COOKING APPARATUS WITH A VAPOUR CONDENSATION DEVICE

FILED OF THE INVENTION

The present invention relates to apparatus for electrical cooking apparatus, such as for example deep fat fryers for household use, which comprise an open housing adapted to be closed by a cover during the cooking phase and which is provided with a base, a cooking vat disposed in the housing and heated by electrical heating means, and a device for condensation of the cooking vapors which is associated with said housing and which communicates with the vat by conduit means permitting the flow of cooking vapors.

BACKGROUND OF THE INVENTION

For known cooking apparatus of this type, it has already been proposed to use a removable condensation device, of the heat exchange type, and adapted to eliminate the vapors containing bad smelling substances emitted in the course of cooking, against one of the external surfaces of the housing, and particularly the rear external surface of the housing, by suitable securement means. However, this mounting of the condensation device is difficult to carry out and the securement members used are relatively complicated so as to ensure the permanent holding of the condensation device. Moreover, the fact of adding externally and intimately the condensation device to the housing of the cooking apparatus contributes to rendering particularly cumbersome the apparatus thus provided with its condensation device, and considerably impairs the usual appearance of the cooking apparatus in question, for example a deep fat fryer.

The invention has in particular the object of overcoming these drawbacks.

SUMMARY OF THE INVENTION

According to the invention, an electrical cooking apparatus of the type described above, is more particularly characterized in that the condensation device is retractably mounted in the base of the housing.

Thus, the invention cleverly makes use of the existence of the base of the housing to incorporate therein in a simple manner the condensation device which, in the inserted position, is less cumbersome and fits in perfectly with the overall appearance of the cooking apparatus in question.

According to a preferred embodiment, the condensation device is horizontally slidably mounted in slideways disposed in a recess provided in the base of the housing, and is removable.

BRIEF DESCRIPTION OF THE DRAWINGS

The characteristics and advantages of the invention will become more apparent from the description which follows, by way of non-limiting example, with reference to the accompanying drawings, in which:

FIG. 1 is a schematic view in vertical cross section of an electrical cooking apparatus, such as a deep fat fryer, according to the invention;

FIG. 2 is a schematic view partially in perspective, on an enlarged scale, of the condensation device of FIG. 1, showing the refrigerating box in open position; and FIG. 3 is an exploded perspective view of the cooking apparatus of FIG. 1, without the cover of the housing.

The electrical cooking apparatus 1 shown schematically in FIG. 1 is a household electric deep fat fryer which comprises an open housing or receptacle 3, of generally substantially parallelepipedal shape, in which is disposed a metallic vat 5 adapted to be heated by electrical heating means, such as a heating resistance 6, and containing a frying bath 7. The housing 3 is supported at its bottom 8 by a base 10, better shown in FIG. 3, also of substantially parallel-epipedal shape and preferably made of a single piece with the housing, and is adapted to be closed, during frying, by a cover 12 mounted swingably removably on an upper edge 13 of the housing thanks to disassemblable articulation means (not shown).

The cover 12 comprises on its internal surface a joint 14 shaped so as to provide sealing between the vat 5 and the cover 12 when the latter is closed, as shown in FIG. 1.

The housing 3, the base 10 and the cover 12 are molded of a plastic material such as for example polypropylene which is particularly economical and easy to use.

The fryer 10, FIG. 1, also comprises a vapor condensation device, of the heat exchange type, designated by the overall reference numeral 15 in the figures, and associated with the housing 3, as well as conduit or connection means 18 establishing communication between the upper volume of the vat 5 and the condensation device 15 and permitting the flow of cooking vapors.

According to the invention, the condensation device is retractably mounted in the base 10 of the housing 3.

In the embodiment illustrated in FIG. 1, the condensation device 15 is, on the one hand, horizontally slidably mounted in a recess 22 (FIG. 3) provided in the base 10, and, on the other hand, is removable.

In this example, the recess 22 is constituted by a compartment delimited by the walls of the base 10, opening on its front surface 25 of the base 10 (see FIG. 3) which corresponds to the front surface 27 of the housing 3, and adapted to receive the condensation device 15 leaving between the latter and the rear surface 29 of the base 10 a small space 33, as shown in FIG. 1.

As shown in FIGS. 2 and 3, the condensation device 15 comprises a sealed box 25, of parallelepipedal form, comprising an open receptacle 37 shaped as a drawer and containing identical hermetic refrigerant blocks 39, and a sealed closure cover 41 which, in the example illustrated in FIGS. 2 and 3, is swingably mounted in a removable fashion on an upper edge 43 of the receptacle 37 thanks to disassemblable articulation means (not shown).

In this example, the blocks 39 each have a parallelepipedal shape and extend longitudinally and parallel one beside each other in the receptacle 37 of the box 35 leaving between them condensation channels 45 (FIG. 2) adapted for the flow of cooking vapors. The blocks 39 are of a plastic material and each contain frozen water as the refrigerant agent, if desired with a non-toxic colorant.

As shown in FIG. 3, the blocks 39 are removably mounted in the receptacle 37 of the box 35 and rest flat on cross pieces 48 (FIGS. 1 and 3) above the bottom wall 51 of the receptacle 37 so as to create a lower region, designated 54 in FIG. 1, adapted to collect the condensate. The removable blocks 39 are stored in the freezer of a refrigerator before use, so as to permit the freezing of the water that they contain.

Thanks to their removability, the receptacle 37 and the cover 41 of the box 35, as well as the blocks 39, are easily cleanable, even in a wash basin.

As to FIG. 3, the two lateral surfaces 56 and 57 of the receptacle 37 of the box 35 each carry externally a horizontal rail 59, of which only one is shown in FIG. 3, which engages in a corresponding slideway 61 disposed on one of the side walls of the compartment 22 of the base 10 during insertion by horizontal sliding of the box 35 (with cover 41 closed) into the compartment 22.

In FIGS. 1 to 3, there is shown at 63 a large recess provided in the forward face 65 of the receptacle 37 and forming a gripping means adapted to withdraw the box 35.

As shown in FIG. 1, the means 18 for conducting cooking vapors between the vat 5 and the box 35 with refrigerant blocks 39 forming the condenser, comprises a tubular member forming a conduit 68 which is integrated into the cover 12 of the housing 3 and of which one end 68a opens into the upper volume of the vat 5, and another tubular member also forming a conduit 70 (better seen in FIG. 3) which extends vertically into a transverse opening 72 provided in the housing 3, from the upper edge 13 of its rear surface 74; the conduit 70 carries a joint 76 adapted to ensure sealing at the level of the opening 72. As shown in FIG. 3, the conduit 70 has an L-shaped section of which the vertical leg 70a passes through the opening 72 and is connected in a sealed manner to the other end 68b of conduit 68, and of which the horizontal leg 70b opens into the internal space 63 of the base 10 (see FIG. 1) and is engaged in a sealed manner by its free end in a corresponding inlet opening 78 provided in the rear surface 81 of the receptacle 37 of the box 35.

As to FIGS. 1 and 3, the base 10 of the housing 3 comprises in its internal space 33 (FIG. 1) a safety switch 85 adapted to detect the correct positioning of the box 35 (containing the blocks 39) in the compartment 22 of the base 10 so as to permit electrical supply of the resistance 6 for heating the vat 5.

Referring to FIG. 1 and supposing that the box 35 (with cover 41 closed) containing the blocks 39 is correctly positioned in the compartment 22 of the base 10, the evacuation and elimination of the vapors present in the deep fat fryers is carried out in the following manner:

In the course of frying, the vapors (shown by arrows) which are given off and which contain bad smelling substances, escape through the conduit 68, flowing downwardly in the conduit 70 and entering the box 35 via the inlet opening 78. They then enter into contact with the frozen blocks of water 39 by passage through the condensing channels 45 (FIG. 2) in which they condense, the water of condensation containing the bad smelling substances falling into the collecting region 54 of the box 35.

We claim:

1. In an electrical cooking apparatus comprising an open housing (3), a cover (12) closing the housing during the cooking phase and which is provided with a base (10), a cooking vat (5) disposed in the housing (3) above the base (10) and heated by electrical heating means (6), and a device (15) for condensing the cooking vapors which is associated with said housing and which communicates with the vat (5) through conduit means (18) permitting the flow of cooking vapors; the improvement wherein the condensation device (15) is retractably mounted in the base (10) of the housing (3).

2. Electrical cooking apparatus according to claim 1, wherein the condensation device (15) is horizontally slidably mounted in slideways (61) disposed in a recess (22) provided in the base (10) of the housing.

3. Electrical cooking apparatus according to claim 2, wherein the recess (22) opens in the front face (25) of the base (10) of the housing.

4. Electrical cooking apparatus according to claim 1, wherein the condensation device (15) is removable from the base.

5. Electrical cooking apparatus according to claim 1, in which the condensation device (15) comprises a sealed box (35) containing removable hermetic refrigerant blocks (39), and wherein said box (35) is shaped as a drawer of substantially parallelepipedal form.

6. Electrical cooking apparatus according to claim 5, wherein the box (35) comprises a receptacle (37) which is closed in a sealed manner by a removable cover (41).

7. Electrical cooking apparatus according to claim 5, in which the blocks (39) are arranged in the box (35) relative to each other so as to provide between them condensation channels (45) through which flow the cooking vapors, and wherein said blocks (39) rest flat on cross pieces (48) above the bottom (51) of the box (35) so as to create a lower region (54) adapted to collect condensate.

8. Electrical cooking apparatus according to claim 3, wherein the means (18) for conducting the vapors between the vat (5) and the box (35) comprises a first tubular member forming a conduit (68) which is integrated into the cover (12) of the housing (3) and of which one end (68a) opens into the upper volume of the vat (5), and a second tubular member also forming a conduit (70) which extends vertically in a first through opening (72) provided in the housing (3), from the upper edge (13) of the rear surface (74) of said housing, of which the upper end (70a) is in sealed communication with the other end (68b) of the first tubular member (68), and of which the lower end (70b) opens into the base (10) and has a terminal portion which is engaged sealingly in a second opening (78) provided in the rear region (81) of the box (35).

9. Electrical cooking apparatus according to claim 5, wherein the box (35) has on its forward surface (65) a gripping member (63).

10. Electrical cooking apparatus according to claim 1, wherein the base (10) comprises a safety switch (85) adapted to detect the correct positioning of the condensation device (15) in the base (10) of the housing so as to permit electrical supply of the heating means (6).

11. Electrical cooking apparatus according to claim 1, which is a deep fat fryer.

* * * * *